(12) United States Patent
Chou et al.

(10) Patent No.: US 6,358,014 B1
(45) Date of Patent: Mar. 19, 2002

(54) COMPOSITE SPINNER AND METHOD OF MAKING THE SAME

(75) Inventors: Chen-Yu J. Chou, Cincinnati; Gerald A. Pauley, Hamilton; Yiping Xu, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/535,923

(22) Filed: Mar. 24, 2000

(51) Int. Cl.⁷ .......................... B64C 11/14; B29C 35/02
(52) U.S. Cl. .................. 416/245 R; 416/94; 416/224; 29/889.1
(58) Field of Search ............... 416/245 R, 224, 416/94, 1; 29/889.1; 428/34.1, 35.9, 63, 408, 902; 156/98, 153, 267, 293, 294; 415/218.1, 219.1

(56) References Cited

U.S. PATENT DOCUMENTS

| 4,471,609 A | * | 9/1984 | Porter et al. ............ 244/117 A |
| 4,624,820 A | * | 11/1986 | Barraclough .............. 264/512 |
| 4,699,568 A | * | 10/1987 | Harlamert et al. ....... 416/245 R |
| 4,957,415 A | | 9/1990 | Pual et al. .............. 416/245 R |
| 5,149,251 A | * | 9/1992 | Scanlon et al. .......... 416/245 R |
| 5,182,906 A | | 2/1993 | Gilchrist et al. ........... 60/226.1 |
| 5,252,160 A | * | 10/1993 | Scanlon et al. .......... 416/245 R |
| 5,279,892 A | | 1/1994 | Baldwin et al. ............ 428/257 |
| 5,833,435 A | * | 11/1998 | Smith ..................... 416/245 R |

FOREIGN PATENT DOCUMENTS

EP 0294654 A2 * 5/1988 ............. 416/245 R

* cited by examiner

Primary Examiner—Edward K. Look
Assistant Examiner—Richard Woo
(74) Attorney, Agent, or Firm—Andrew C. Hess; Nathan D. Herkamp

(57) ABSTRACT

Increased impact resistance capability is achieved in a cost and weight efficient manner by providing a spinner made of a 3-D orthogonal woven composite material. The spinner defines a generally conical shell having a plurality of axial rib stiffeners and at least one circumferential rib stiffener integrally formed thereon. The combination of the integral rib stiffeners with the 3-D orthogonal woven composite material results in a substantially greater torsional stiffness. The use of the 3-D orthogonal woven composite material also eliminates delamination found in laminated composite spinners.

17 Claims, 4 Drawing Sheets

COMPOSITE SPINNER AND METHOD OF MAKING THE SAME

BACKGROUND OF THE INVENTION

This invention relates generally to rotating dome-shaped structures and more particularly to spinners used in high bypass ratio turbofan engines.

Numerous applications exist for turbomachinery, such as gas turbine engines used to propel a variety of aircraft. One such gas turbine engine is the high bypass ratio turbofan engine, which includes a large, ducted fan usually placed at the front of the engine. The fan serves to produce greater thrust and reduce specific fuel consumption. Typically, the fan in a high bypass ratio turbofan engine includes a fan hub or disk drivingly connected to a shaft driven by the engine's low pressure turbine, and a number of fan blades mounted to the disk. A dome-shaped member, known as a spinner, is attached to the front of the fan disk to provide an aerodynamic flow path for air entering the fan. Given its location at the front of the engine, the spinner is susceptible to being struck by foreign objects during flight. Accordingly, spinners must be capable of withstanding such impacts while contributing minimal additional weight to the engine.

To accomplish this, conventional spinners are made from materials having high strength-to-weight ratios, such as aluminum. Laminated composite materials have also been suggested for spinner applications. However, conventional laminated composites have lower interlaminar shear strength and impact resistance capability than metal. When a foreign object strikes a laminated composite spinner, the composite layers tend to delaminate along the resin matrix. In order to improve impact resistance, the composite structure must be designed to be thicker than a metal counterpart. The result is that the weight advantage of using the composite material will be diminished and the cost of making the thicker structure can become prohibitive.

The same problems exist for spinners or other rotating dome members used in applications other than high bypass ratio turbofan engines. Examples include propeller spinners in turboprop engines, the spinner or fairing on top of a helicopter rotor, and similar structure found in marine engines.

Accordingly, there is a need for an improved spinner to resolve the problems associated with prior spinners and thereby provide increased impact resistance capability in a cost and weight efficient manner.

BRIEF SUMMARY OF THE INVENTION

The above-mentioned need is met by the present invention which provides a spinner made of a three dimensional orthogonal woven composite material The spinner defines a generally conical shell having a plurality of axial rib stiffeners and at least one circumferential rib stiffener integrally formed thereon.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
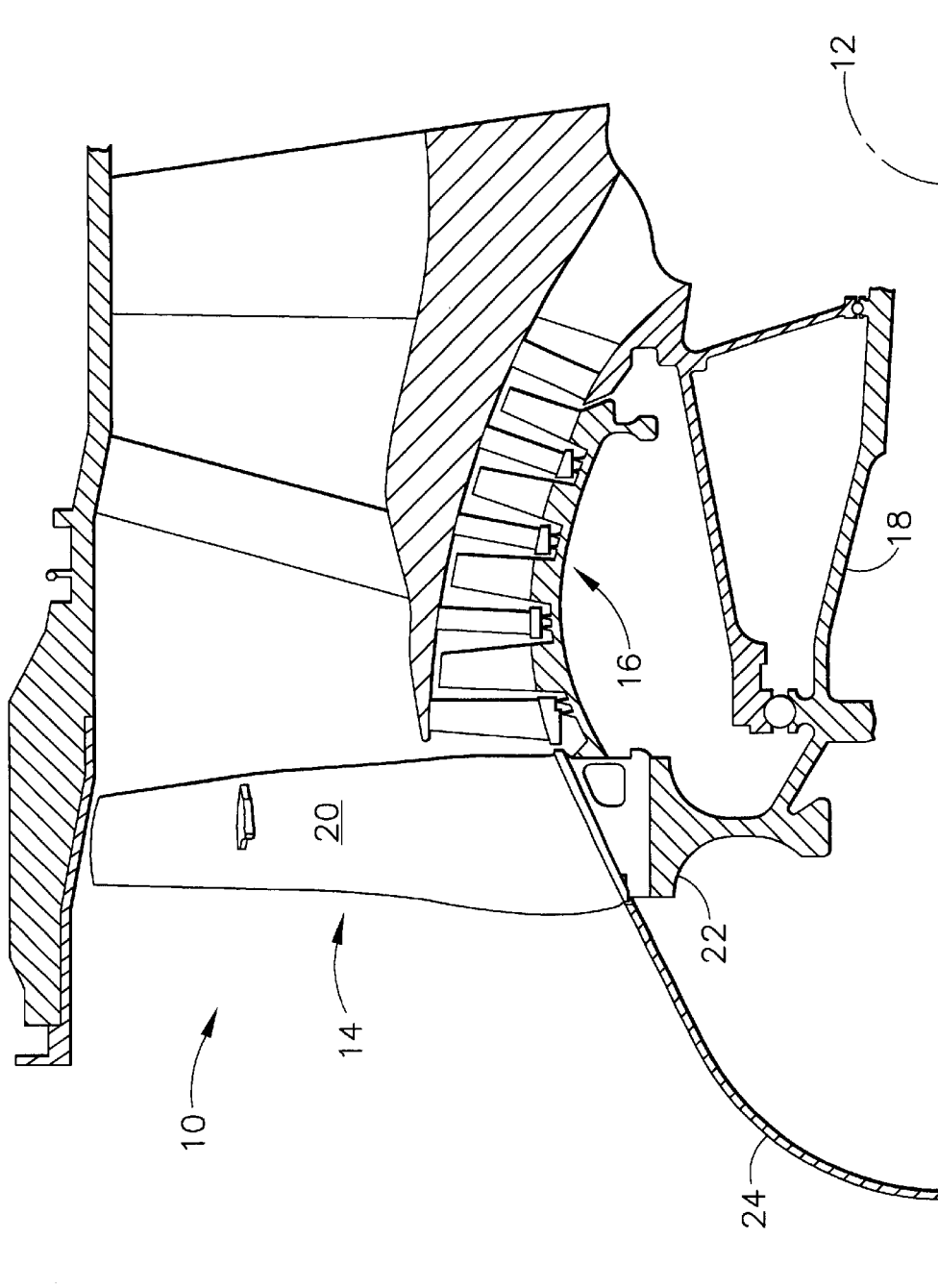
FIG. 1 is a longitudinal cross-sectional view illustrating a conventional high bypass ratio turbofan engine.

Referring to the drawings wherein identical reference numerals denote the same elements throughout the various views, FIG. 1 illustrates a longitudinal cross-sectional view of a conventional high bypass ratio turbofan engine 10. The engine 10 includes, in serial axial flow communication about a longitudinal centerline axis 12, conventional structures including a fan rotor 14 and a booster 16. The other conventional structures of the engine 10, such as a high pressure compressor, combustor, high pressure turbine, and low pressure turbine are not shown for clarity of illustration. The fan rotor 14 and booster 16 are drivingly connected to the low pressure turbine via a rotor shaft 18. The fan rotor 14 comprises a plurality of radially extending blades 20 (only one of which is shown in FIG. 1) mounted on an annular disk 22, wherein the disk 22 and the blades 20 are rotatable about the longitudinal centerline axis 12 of engine 10. A dome-shaped spinner 24 is attached to the front of the disk 22 and projects forwardly from the row of fan blades 20.

Conventional spinners used in various engines have a wide variety of shapes. Typically, the configuration of a spinner is either elliptical or conical, with each shape having both advantages and disadvantages. The elliptical shaped spinner tends to shed or rebound debris outwardly of the core engine and into the engine's bypass duct, thus providing the engine core with a level of protection against entry of ice, hail and other foreign objects. On the other hand, cold temperature testing has demonstrated that a conical spinner will generally build up less ice than an elliptical spinner for the same operating conditions and environment. However, the conical spinner produces little or no outward rebound of debris and thus can permit a large amount of such debris to pass into the core engine, where significant damage can occur.

Figure 2:
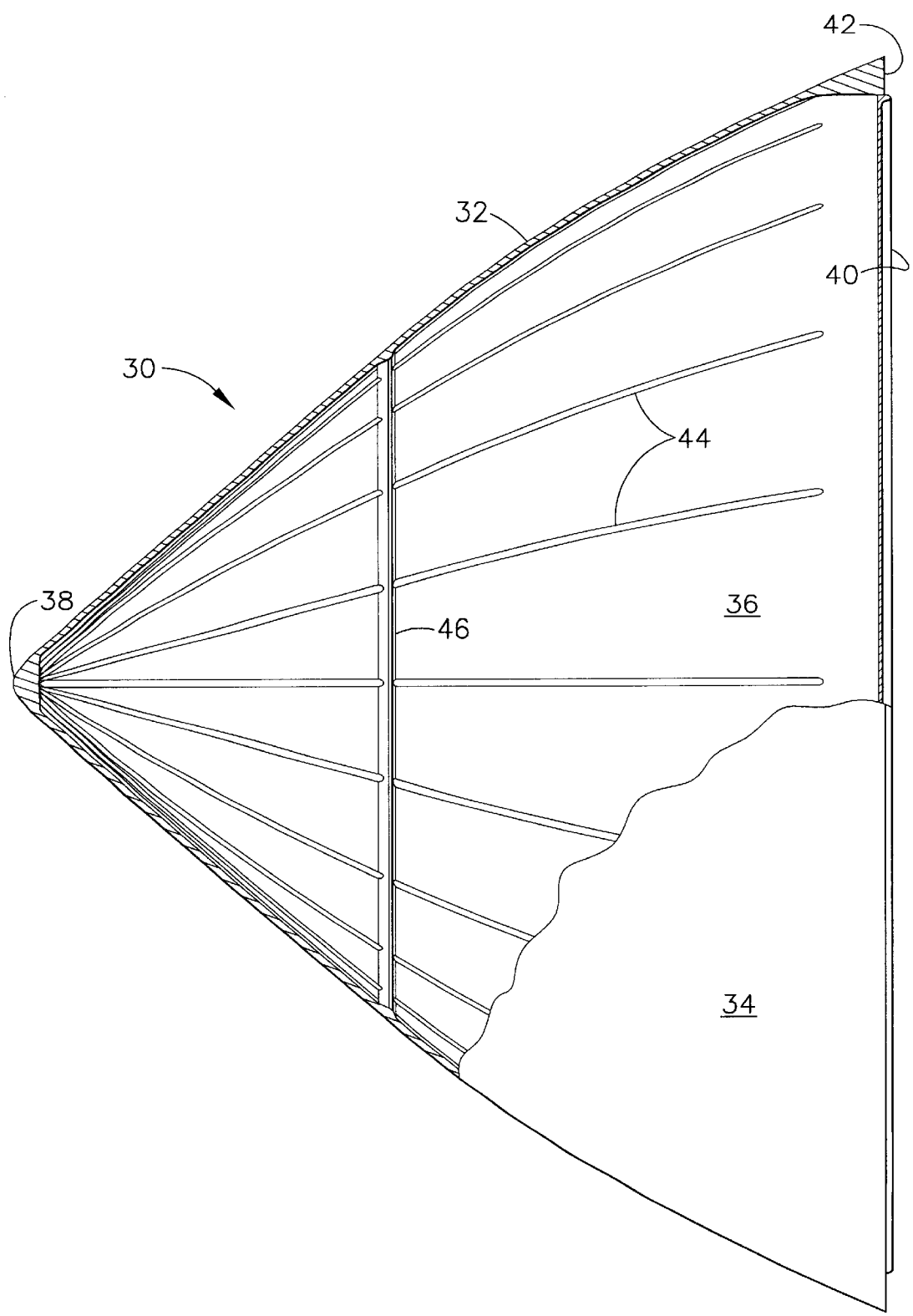
FIG. 2 is an elevation view, in partial cut-away, of the spinner of the present invention.
Figure 3:
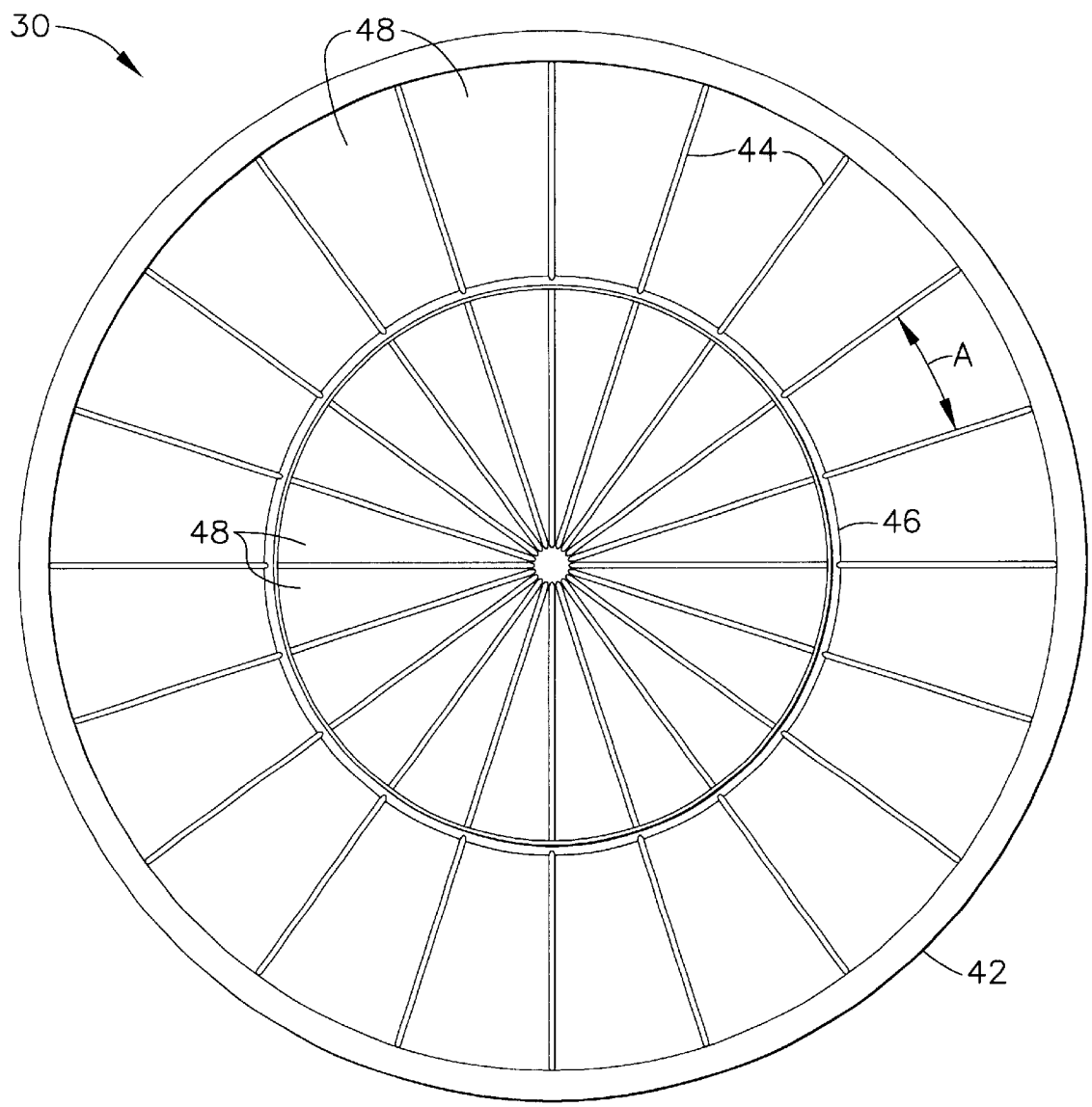
FIG. 3 is an end view of the spinner of FIG. 2.

Turning now to FIGS. 2 and 3, one preferred embodiment of a spinner 30 is shown. It should be noted that the spinner 30 could be used as the spinner in a high bypass ratio turbofan engine, for instance, as a replacement for the conventional spinner 24 of FIG. 1. The spinner 30 could also be used in other applications such as propeller spinners in turboprop engines, spinners for helicopter rotors or marine engines, and other rotating dome-shaped structures. Thus, as used herein, the term "spinner" refers to all such rotating dome-shaped structures.

The spinner 30 is a dome-shaped structure that has an outer wall 32 defining a generally conical shell having a convex outer surface 34 and a concave inner surface 36. As discussed above, spinners ordinarily have an elliptical or conical shape. Thus, although shown in FIG. 2 as being substantially conical, the spinner 30 could also be elliptical or a similar dome shape. As used herein, the term "generally conical" refers to conical, elliptical and other such domed shapes. The spinner 30 extends from a closed nose 38 to an open trailing edge 40, and the outer surface 34 is configured to provide an aerodynamic surface that also resists ice formation. The spinner 30 is provided with an annular flange 42 around the trailing edge 40 for attaching the spinner 30 to its support structure, such as a fan rotor in a turbofan engine, in a conventional manner.

To increase its structural strength, the spinner 30 is provided with a plurality of axial rib stiffeners 44 that extend axially from the nose 38 to, or at least close to, the trailing edge 40. Although they could be formed on the convex outer surface 34, the axial rib stiffeners 44 are preferably formed on the concave inner surface 36 so as to not detract from the aerodynamics or ice resistance of the spinner 30. Preferably, but not necessarily, about 18–24 of the axial rib stiffeners 44 are provided, and they are equally spaced about the spinner 30 so that adjacent ones define an angle A of about 15–20 degrees as shown in FIG. 3.

The spinner 30 also includes at least one circumferential rib stiffener 46 extending circumferentially (i.e., perpendicularly to the axial rib stiffeners 44) about the spinner 30 and connecting the axial rib stiffeners 44. Although only one such circumferential rib stiffener 46 is shown in the Figures, it should be understood that additional circumferential rib stiffeners could be included if additional torsional stiffness in the circumferential direction is needed.

Figure 4:
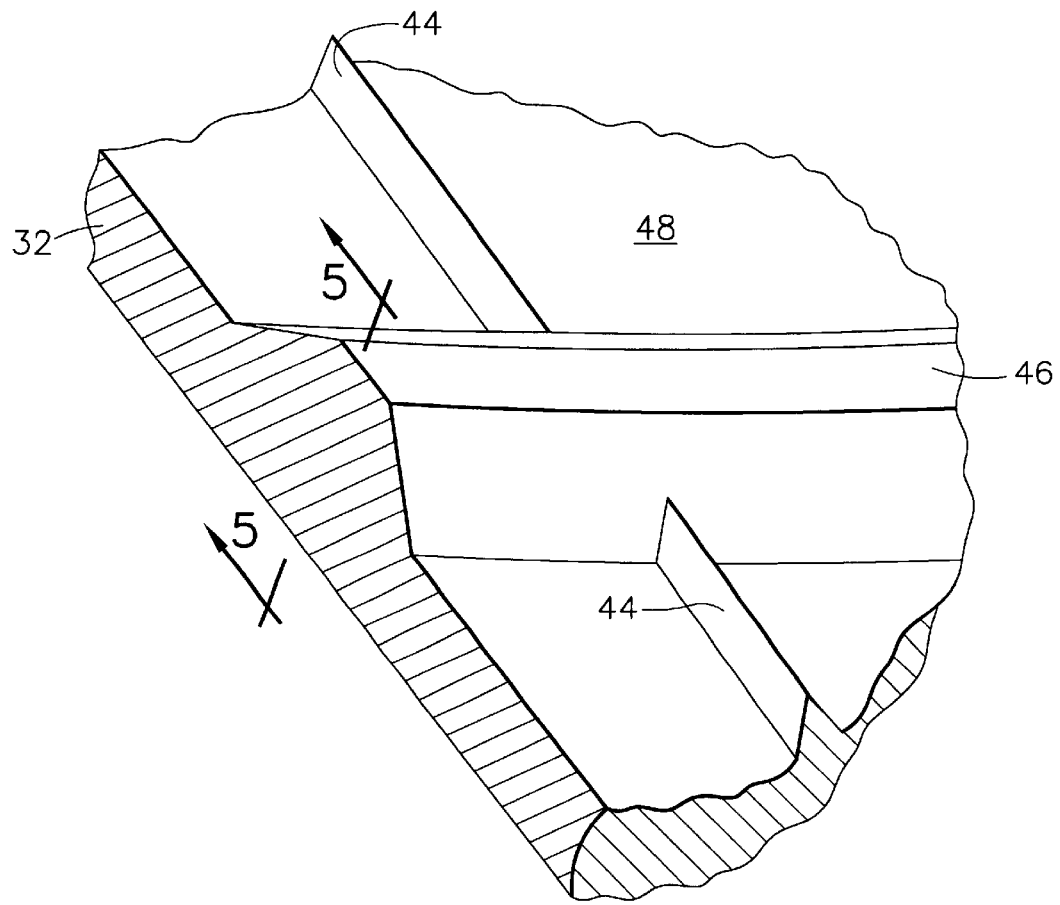
FIG. 4 is an enlarged, fragmentary perspective view of the spinner showing a portion thereof in greater detail.

The circumferential rib stiffener 46 is located intermediate the nose 38 and the trailing edge 40, and is preferably located slightly forward of the midpoint for optimal structural integrity. Like the axial rib stiffeners 44, the circumferential rib stiffener 46 is preferably formed on the concave inner surface 36. Thus, the concave inner surface 36 is separated into a plurality of internal bays 48 by the axial and circumferential rib stiffeners 44, 46, which protrude inwardly from the internal bays 48. Referring to FIG. 4, it is seen that the circumferential rib stiffener 46 is wider and thicker than the axial rib stiffeners 44. This is because the spinner 30 generally has fewer of the circumferential rib stiffeners 46 than the axial rib stiffeners 44.

The use of the axial and circumferential rib stiffeners 44, 46 permits the spinner 30 to have distinct shear stiffness ratios in both the axial and circumferential directions, thereby improving the torsional frequency of the spinner 30. Specifically, the axial and circumferential rib stiffeners 44, 46 can be designed for a given application to alleviate and/or change vibration modes as well as increase the spinner's impact strength.

The spinner 30 is a one-piece structure made entirely of a three dimensional (3-D) orthogonal woven composite material. The composite material comprises a fiber preform embedded in a resin matrix. The fiber preform comprises a plurality of continuous fiber tows woven into a 3-D orthogonal weave defining a near-net-shape that approximates the desired final shape of the spinner 30. (As used herein with respect to fibers, the term "continuous" refers to a length-to-thickness ratio that is extremely large, even approaching infinity. With the 3-D orthogonal woven configuration, the fiber tows extend in three mutually perpendicular directions, which are typically referred to as the warp, weft and vertical directions. The fiber volume content of the spinner 30 is preferably 50 to 70% of the total spinner volume.

Figure 5:
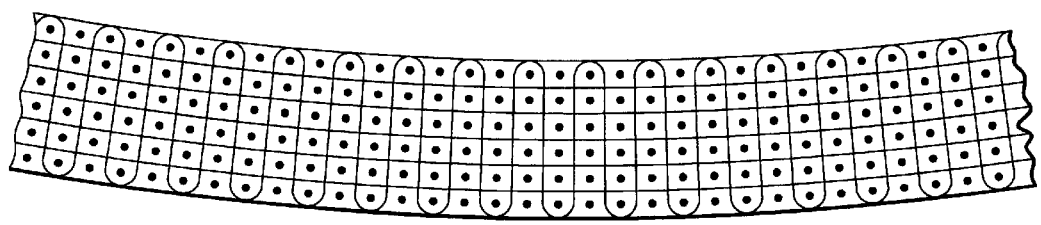
FIG. 5 is a partial, sectional view of the spinner taken along line 5—5 of FIG. 4.

As seen in FIG. 5, the resulting construction is such that the outer wall 32 of the spinner 30 has a through-the-thickness, 3-D orthogonal woven architecture. That is, the spinner 30 has continuous fiber tows woven through-the-thickness, or in the vertical direction, in addition to continuous fiber tows woven in in the warp and weft directions. The through-the-thickness 3-D orthogonal woven architecture exists in all structural portions of the spinner 30, i.e., the outer wall 32, including the internal bays 48, the axial rib stiffeners 44, and the circumferential rib stiffener 46. All of these elements (the outer wall 32, the axial rib stiffeners 44, and the circumferential rib stiffener 46) are thus integrated into an integral, one-piece structure by the fiber tows such that the axial and circumferential rib stiffeners 44, 46 are integrally formed with the outer wall 32.

The fiber tows are preferably made from a resilient, relatively high strength material. Examples of suitable fiber materials include graphite, glass, glass-graphite hybrids and aramid fibers sold under the tradename KEVLAR®. The resin matrix can comprise any suitable resin that is resin transfer moldable. Examples of suitable resins include epoxy resins such as the PR-500 and PR-520 resins commercially available from 3M Company.

One preferred process for manufacturing the spinner 30 combines 3-D weaving and resin transfer molding. Thus, the first step is to weave the fiber tows into a 3-D preform, preferably using a fully automated loom or weaving machine. The fiber preform is woven into a near-net-shape that approximates the desired final shape of the spinner 30. Thus, the preform defines a generally conical shape with axial ridges and at least one circumferential ridge interwoven therein that correspond to the axial and circumferential rib stiffeners 44, 46. Next, the preform is placed into a mold having a mold cavity that conforms to the desired final shape of the spinner 30. The mold is closed and resin is injected therein under moderate pressure so as to fully impregnate the fiber preform The resin-impregnated fiber preform is then heated in the mold to a sufficient temperature and for a sufficient time to cure the resin-impregnated fiber preform. The resultant hardened composite material conforms to the shape of the mold cavity, and thus forms the spinner 30.

This process results in a non-layered, 3-D orthogonal woven spinner 30 that has a high weight-to-strength ratio and a strong impact resistance to foreign objects. The spinner 30 is also significantly lighter than metal spinners of comparable size. A further advantage is that with the fully automated woven composite manufacturing process, the cycle time and cost of producing the spinner 30 are much less than for conventional spinners. And unlike laminated composites, the non-layered, 3-D orthogonal woven composite that the spinner 30 is made of does not delaminate from impact energy. Furthermore, the use of through-the-thickness fiber architecture and the axial and circumferential rib stiffeners results in a torsional stiffness that is approximately four times greater than the torsional stiffness of laminated composite spinners. The woven composite architectures can be easily tailored to meet both structural and dynamic design requirements. The arrangement of the axial and circumferential rib stiffeners 44, 46 can be structurally optimized without incurring weight penalties.

While specific embodiments of the present invention have been described, it will be apparent to those skilled in the art that various modifications thereto can be made without departing from the spirit and scope of the invention as defined in the appended claims.

What is claimed is:

1. A spinner made of a three dimensional orthogonal woven composite material, said spinner comprising a three dimensional preform of woven continuous fiber tows having a generally conical shape with a plurality of axial ridges and at least one circumferential ridge interwoven therein, said spinner defining a generally conical shell having a plurality of axial rib stiffeners corresponding to said axial ridges and at least one circumferential rib stiffener corresponding to said circumferential ridge formed thereon.

2. The spinner of claim 1 wherein said shell comprises a nose and a trailing edge and has a concave inner surface.

3. The spinner of claim 2 wherein said axial rib stiffeners extend from said nose to a point near to said trailing edge.

4. The spinner of claim 2 wherein said circumferential rib stiffener is located intermediate said nose and said trailing edge.

5. The spinner of claim 2 wherein said axial and circumferential rib stiffeners are formed on said concave inner surface.

6. The spinner of claim 1 wherein said preform is embedded in a resin matrix.

7. The spinner of claim 1 wherein said shell, said axial rib stiffeners, and said circumferential rib stiffener define an integral, one-piece member.

8. The spinner of claim 1 further comprising an annular flange formed on said trailing edge.

9. A spinner comprising:
an outer wall defining a generally conical shell having a nose and a trailing edge and defining a concave inner surface;
a plurality of axial rib stiffeners integrally formed with said outer wall; and
at least one circumferential rib stiffener integrally formed with said outer wall, wherein said outer wall, said axial rib stiffeners and said circumferential rib stiffener are all made of a three dimensional orthogonal woven composite material, and wherein said composite material includes a plurality of continuous fiber tows woven into a preform including a plurality of axial ridges corresponding to said axial rib stiffeners and at least one circumferential rib stiffener corresponding to said circumferential rib stiffener.

10. The spinner of claim 9 wherein said axial rib stiffeners extend from said nose to a point near to said trailing edge.

11. The spinner of claim 9 wherein said circumferential rib stiffener is located intermediate said nose and said trailing edge.

12. The spinner of claim 9 wherein said axial and circumferential rib stiffeners are formed on said concave inner surface.

13. The spinner of claim 9 wherein said continuous fiber tows are embedded in a resin matrix.

14. The spinner of claim 9 further comprising an annular flange formed on said trailing edge.

15. A method of making a spinner comprising the steps of:
weaving continuous fiber tows into a three dimensional preform having a generally conical shape with a plurality of axial ridges and at least one circumferential ridge interwoven therein;
placing said preform into a mold;
injecting resin into said mold so as to fully impregnate said preform; and
curing said fully impregnated preform.

16. The method of claim 15 wherein said step of weaving continuous fiber tows into a three dimensional preform is performed on a fully automated loom.

17. The method of claim 15 wherein said mold has a mold cavity that conforms to the desired final shape of said spinner.

* * * * *